(12) United States Patent
Friesen et al.

(10) Patent No.: US 12,477,993 B2
(45) Date of Patent: Nov. 25, 2025

(54) BALE ACCUMULATOR WITH DECOUPLABLE FRONT BALE SUPPORTS ENABLING YAW-CAPABLE ROAD TRANSPORT

(71) Applicant: Phiber Manufacturing Inc., Crystal City (CA)

(72) Inventors: Derek James Friesen, Crystal City (CA); Harvey George Bergen, Crystal City (CA); Ryan Stephen Barbour, Crystal City (CA); Sean David Chevalier, Crystal City (CA)

(73) Assignee: Phiber Manufacturing Inc., Crystal (CA)

( * ) Notice: Subject to any disclaimer, the term of this patent is extended or adjusted under 35 U.S.C. 154(b) by 0 days.

(21) Appl. No.: 18/918,640

(22) Filed: Oct. 17, 2024

(65) Prior Publication Data
US 2025/0143219 A1    May 8, 2025

Related U.S. Application Data

(60) Provisional application No. 63/595,433, filed on Nov. 2, 2023.

(51) Int. Cl.
*A01D 85/00* (2006.01)
*A01D 90/08* (2006.01)

(52) U.S. Cl.
CPC ........... *A01D 85/005* (2013.01); *A01D 90/08* (2013.01); *A01D 2085/007* (2013.01)

(58) Field of Classification Search
CPC .................. A01D 85/005; A01D 90/08; A01D 2085/007; A01D 90/083; A01D 2085/008;
(Continued)

(56) References Cited

U.S. PATENT DOCUMENTS

| | | | | |
|---|---|---|---|---|
| 4,478,547 A | * | 10/1984 | Den Boer | A01D 90/083 |
| | | | | 414/24.5 |
| 4,955,774 A | * | 9/1990 | Van Eecke | A01D 90/08 |
| | | | | 414/502 |

(Continued)

FOREIGN PATENT DOCUMENTS

| | | | | | |
|---|---|---|---|---|---|
| CA | 2264465 C | * | 3/2000 | | A01D 90/08 |
| DE | 4327591 A1 | * | 2/1995 | | A01D 85/005 |
| EP | 0424192 A1 | * | 4/1991 | | A01D 90/083 |

*Primary Examiner* — Gregory W Adams
(74) *Attorney, Agent, or Firm* — Kyle R Satterthwaite; Ryan W. Dupuis; Ade & Company Inc.

(57) ABSTRACT

A bale accumulator for towed conveyance behind a rectangular baler features a bale platform for receiving the bales, a variable length drawbar enabling selective adjustment of the platform between a working field position of close working adjacency and statically in-line relation to the baler, and a road transport position trailing further therebehind and movable relative thereto about a yaw axis. Using an actuated coupler/decoupler, a bale pusher movable longitudinally of the platform to dump accumulated bales onto the field is selectively couplable to, and decouplable from, one or more elongated front bale supports slidably engaged with the baler, over which ejected bales can ride continuously from the baler without awaiting reset of the bale pusher. The front bale supports are coupled to the pusher for working use therewith in the working field mode, and decoupled therefrom to permit yawing of the platform in road transport mode.

23 Claims, 9 Drawing Sheets

(58) Field of Classification Search
CPC .... A01D 87/122; A01D 87/127; A01D 90/02; A01D 90/10; A01F 25/04; B65G 57/28; B65G 67/04; B65G 2201/0202; B66F 9/18
USPC .............................. 414/111, 24.5, 24.6, 132
See application file for complete search history.

(56) References Cited

U.S. PATENT DOCUMENTS

| | | | |
|---|---|---|---|
| 6,851,908 B2 * | 2/2005 | Bergen | A01D 85/005 414/517 |
| 9,066,471 B1 * | 6/2015 | Monahan | A01D 90/083 |
| 11,325,435 B1 * | 5/2022 | Riddle | B60D 1/322 |

* cited by examiner

FIG. 7

BALE ACCUMULATOR WITH DECOUPLABLE FRONT BALE SUPPORTS ENABLING YAW-CAPABLE ROAD TRANSPORT

CROSS-REFERENCE TO RELATED APPLICATIONS

This application claims benefit under 35 U.S.C. 119 (e) of U.S. Provisional Application No. 63/595,433, filed Nov. 2, 2023, the entirety of which is incorporated herein by reference.

FIELD OF THE INVENTION

The present invention relates generally to bale accumulators towable behind agricultural balers to enable multi-bale field deposit of produced bales, and more particularly to bale accumulators whose bale platforms are transitionable between a working field position closely adjacent the baler and a road transport mode trailing further behind the baler and swingable relative thereto about an upright yaw axis for tighter road cornering.

BACKGROUND

Applicant's prior U.S. Pat. No. 6,851,908 discloses a bale accumulator for towed use behind a rectangular baler that forms rectangular bales of crop material during tractor-towed conveyance of the baler across an agricultural field. In brief, the bale accumulator comprises a bale platform for receiving bales extruded from a rear discharge of the baler, a lateral positioning device for arranging a group of the bales on the platform as they are extruded one by one from the baler, and a bale pusher for longitudinally displacing the arranged group of bales rearwardly of the platform for deposit of the arranged group of bales onto the field. A particularly unique aspect of this patented design is the inclusion of one or more elongated front bale supports operatively coupled between a floor of the baler's rear discharge and the bale pusher of the accumulator. Typically composed of a spring steel strap, for example embodied as a single-leaf leaf spring with a rolled eye at each end, a front end of each front bale support is carried by a front mount slidably received in a floor channel of the baler's rear discharge, while a rear end of each front bale support is mounted to the longitudinally displaceable bale pusher of the accumulator.

When the bale pusher is in a default ready position near the front end of the bale platform, and a fresh rectangular bale is ejected from the rear discharge of the baler, the bale rides atop this front bale support during its ejection from the baler, and lands on the bale platform in a pushable position behind bale pusher. The lateral positioning device can push this first ejected bale laterally off to one side of the platform, then push a second ejected bale laterally off to the opposing side of the platform, opening up space for a third bale between those first two laterally offset bales, thus creating an aligned row of three bales, which as a group can then be discharged rearwardly off of the bale platform by rearwardly actuated displacement of the bale pusher in a pushing stroke. Depending on the platform width and bale size, bale groupings of up to five bales can be accommodated, with the third bale being pushed off to the same first side of the platform as the first bale, the fourth bale being pushed off to the same second side of the platform as the second bale, and thereby accommodating a fifth bale between the third and fourth bales.

When the bale pusher is actuated rearwardly to effect such a pushing stroke on the grouped bales, the bale pusher pulls the rear end of the one or more front bale supports rearwardly with it, thus ensuring that, at all times throughout the movement range of the bale pusher, the one or more front bale supports span the entire distance from the rear discharge of the baler to the bale pusher, whereby there is no opportunity for an ejected bale from the baler to fall problematically in front of the bale pusher. The baler can thus be run continuously, without need to pause the baler during forward reset of the bale pusher back to its ready position.

More recently, some manufacturers have equipped their bale accumulators with telescopically extendable/collapsible drawbars by which the bale platform of the accumulator can be moved between a working field position of close adjacency to the rear discharge of the baler, and a road transport position of further rearward distance from the rear discharge of the baler. With the bale platform in the working field position, the ground wheels of the accumulator are set in a caster mode in which they can swivel about upright axes, permitting change in the orientation of the rotational axes of the ground wheels, and the bale platform is held fast against any yawing movement relative to the baler, and thus trails the baler in a consistent in-line relation thereto, where bisecting longitudinal midplanes of the baler and the bale accumulator remain parallel at all times, keeping the bale platform consistently inline with the rear discharge of the baler. However, with the telescopic drawbar extended, and the bale platform in the road transport position, the ground wheels are locked in a non-caster mode that sees the wheels axes fixed perpendicularly to the longitudinal midplane of the accumulator, and the bale platform is free to yaw relative to the baler about an upright yaw axis defined at the hitched coupling point between the drawbar of the accumulator and the hitch of the baler. During road travel, the accumulator can thus swing relative to the baler about this yaw access, for better maneuverability and tighter cornering.

However, these competitor machines lack the beneficial front bale supports of Applicant's aforementioned patent, the connection of which between the bale pusher of the accumulator and the rear discharge conflicts with the possibility of any possible yaw movement between the baler and the accumulator. It would be desirable to provide a novel accumulator design by which the beneficial use of front bale supports of the type found in Applicant's previously patented design could be exploited, in a manner that doesn't prohibit a yaw-capable transport mode for improved roadway maneuverability.

SUMMARY OF THE INVENTION

According to a first aspect of the invention, there is provided a bale accumulator for towed conveyance behind a rectangular baler that produces rectangular bales of crop material as the baler traverses an agricultural field in a forward travel direction and extrudes the bales longitudinally rearward from a rear discharge of the baler, said bale accumulator comprising:
  a platform for receiving said rectangular bales from the rear discharge of the baler;
  a variable length drawbar attached to said platform, said variable length drawbar being longitudinally extendable and collapsible to vary a distance between said platform and said rear discharge of the baler, thereby enabling selective adjustment of the platform between a working field position and a road transport position, of which said working field position is of closer adjacency to said rear discharge of the baler than said transport position;

a hitch coupler installed on said variable length drawbar adjacent a leading end thereof for coupled connection to a hitch mounted on the baler in a manner enabling the platform to yaw relative to the baler, about an upright yaw axis, when in the road transport position;

a bale pusher movably supported on the platform and longitudinally displaceable thereon in a rearward push stroke for pushing bales rearwardly along the platform for discharge therefrom to the field, and in a forward reset stroke resetting the bale pusher to a ready position for a next repetition of the rearward push stroke;

a front bale support of elongated character in the longitudinal direction, and having a front mount configured for longitudinal slidable mounting thereof to the baler, and a rear mount selectively couplable to and decouplable from the bale pusher for longitudinal displacement therewith along the platform when coupled thereto;

a coupler/decoupler installed in cooperatively relationship to the bale pusher and the front bale support and operable to couple the rear mount of the front bale support to the bale pusher for cooperative use thereof in the working field position of the bale platform to enabling riding of the rectangular bales over said front bale support from the rear discharge of the baler to a pushable position behind the bale pusher, and to decouple the rear mount of the front bale support from the bale pusher to permit said yaw movement in the road transport position of the bale platform.

According to a second aspect of the invention, there is provided a method of transitioning a baler and an accompanying bale accumulator from a working field mode to a road transport mode, said method comprising:

(a) in either order:
(i) from a bale pusher of the bale accumulator, decoupling a rear mount of a front bale support of the bale accumulator that, in the working field mode, spans longitudinally forward from bale pusher of the accumulator to the baler, where a front mount of said front bale support is engaged with the baler in a longitudinally slidable manner to permit forward and rearward displacement of said front bale support with the bale pusher; and
(ii) longitudinally extending a variable length drawbar by which the bale accumulator is connected to a hitch of the baler, thereby shifting a platform of the bale accumulator longitudinally rearward from a working field position to a road transport position of increased longitudinal distance from the baler compared to said working field position; and (b) with the platform of the bale accumulator in the road transport position, and with the front bale support of the bale accumulator decoupled from the bale pusher, permitting the bale accumulator to yaw relative to the baler about an upright yaw axis at which the variable-length drawbar is connected to the hitch of the baler, but about which yawing of the bale accumulator is prohibited in the working field mode, owing at least in part to coupled connection of the front bale support of the bale accumulator to the bale pusher thereof.

According to a third aspect of the invention, there is provided a method of transitioning a rectangular baler and an accompanying bale accumulator towed therebehind from a road transport mode, in which yawing movement of the bale accumulator relative to the baler is permitted, to a working field mode, said method comprising:

(a) in either order:
(i) longitudinally collapsing a variable length drawbar by which the bale accumulator is connected to a hitch of the baler, thereby shifting a platform of the bale accumulator longitudinally toward from the baler from a road transport position to a working field position of closer adjacency to the baler than said road transport position; and
(ii) to a bale pusher of the bale accumulator, coupling a rear mount of a front bale support of the bale accumulator that also has a front mount that is engaged with the baler in a longitudinally slidable manner, whereby the front bale support is slidable back and forth with the bale pusher during actuated displacement thereof and enables riding of rectangular bales from a rear discharge of the rectangular baler over said front bale support to a pushable position behind the bale pusher; and (b) with the platform of the bale accumulator in the working field position, and with the front bale support of the bale accumulator coupled to the bale pusher, prohibiting said yawing movement of the bale accumulator relative to the baler so that the bale accumulator resides in and maintains an in-line trailing relationship to the baler.

BRIEF DESCRIPTION OF THE DRAWINGS

Preferred embodiments of the invention will now be described in conjunction with the accompanying drawings in which.

DETAILED DESCRIPTION

FIGS. 1 through 8 illustrate a first embodiment of a bale accumulator 10 of the present invention, to be used in towed cooperation behind a rectangular baler 12, which is turn is conventionally towed behind an agricultural tractor (not shown), and is operable to pickup up windrowed crop material from the agricultural field during towed traversal of the baler thereover to form the picked up crop material into rectangular bales, which are ejected, one at a time, from a rear discharge chute 14 of the baler 12. This rear discharge chute 14 lies distally opposite of a front towing end 16 of the baler 12 from which the baler is towed by the tractor. The direction in which the front towing end 16 of the baler 12 and the rear discharge chute 14 are spaced from one another is referred to herein as a longitudinal direction, visually denoted in the drawings by central longitudinal axis $L_O$ (FIG. 3) that lies in a bisecting vertical midplane of the baler 12. A lateral direction refers to a horizontal direction of orthogonal relationship to that the bisecting vertical midplane, as represented by the illustrated lateral axis LA (FIG. 3) of perpendicular relationship to the longitudinal axis $L_O$. The longitudinal direction corresponds to the forward travel direction in which the baler 12 is towed by the tractor.

As is well known in the art, the bale accumulator 10 is towed behind the baler 12 in trailing relation thereto in the forward travel direction, for the purpose of receiving the ejected rectangular bales from the baler 12 and accumulating a group of multiple bales on the accumulator 10 before depositing that group of bales onto the field, which makes for more efficient collection of the bales from the field, as opposed to deposit of singular bales one-by-one to the field directly from the baler 12. The bale accumulator 10 features a bale platform 18 for seated receipt thereon of the bales ejected from the rear discharge chute 14 of the baler, which in the illustrated example is a three-section bale platform composed of a middle section 18A and two wing sections 18B, 18C that laterally flank the middle section on opposing sides thereof. The wing sections 18B, 18C of the illustrated example are foldable wing sections that are shown unfolded in lowered working positions lying generally coplanar with the middle section 18A, but that can also be folded up into raised transport positions standing upright from the middle section at the opposing sides thereof in preparation for road transport of the bale accumulator between working field uses thereof, thus reducing an overall lateral width of the accumulator 10 during such road transport. Two wing fold actuators 19A, 19B can be seen for such purpose of raising and lowering the wing sections 18B, 18C between their lowered working positions and raised transport positions.

Figure 1:
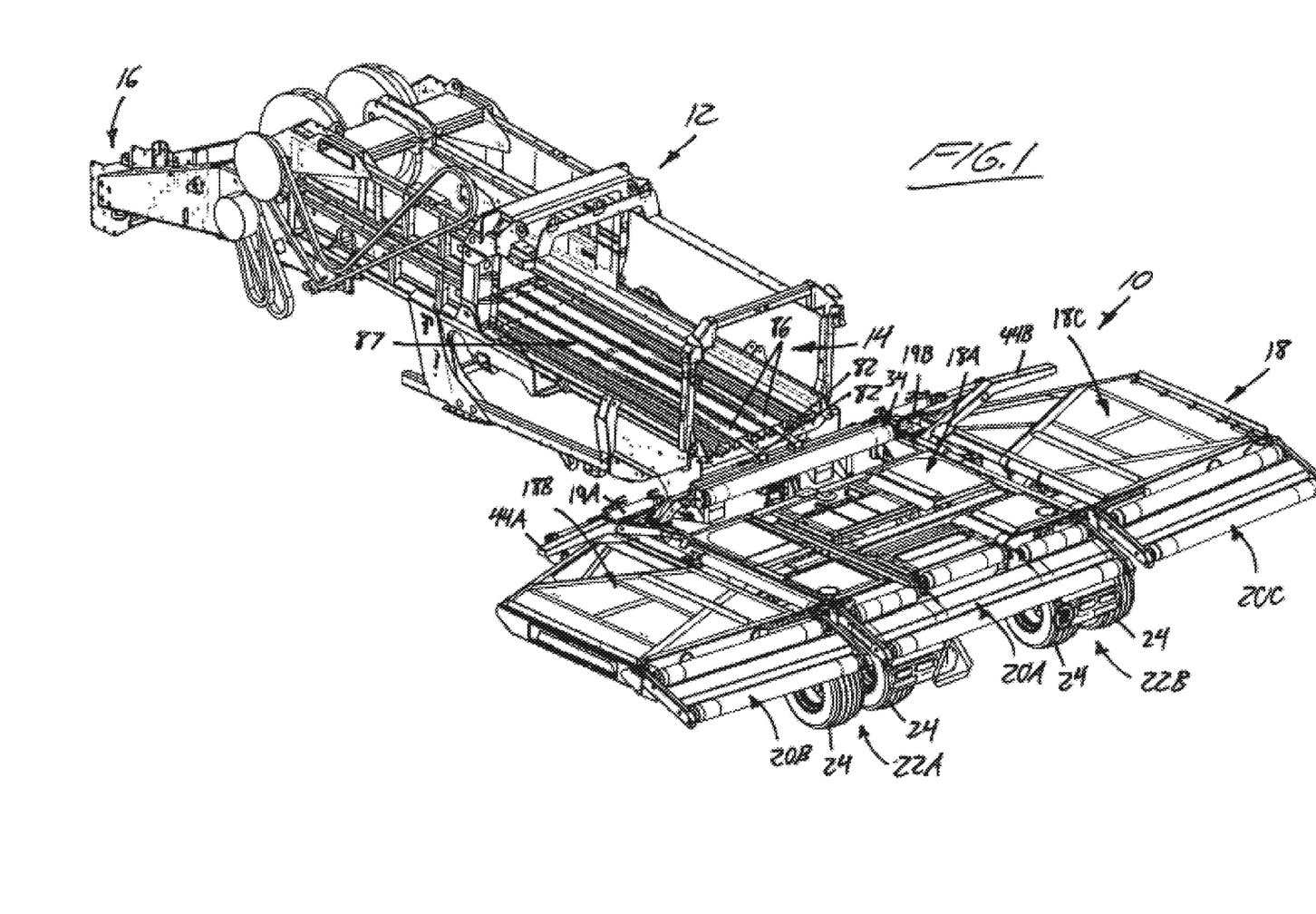
FIG. 1 is a top rear perspective view of a bale accumulator of a first embodiment of the present invention in towed relation behind a rectangular baler, and shows the accumulator in a working field mode in which a bale platform of the accumulator resides closely adjacent a rear discharge of the baler for cooperative working relationship thereto during field use of the baler and accumulator.
Figure 2:
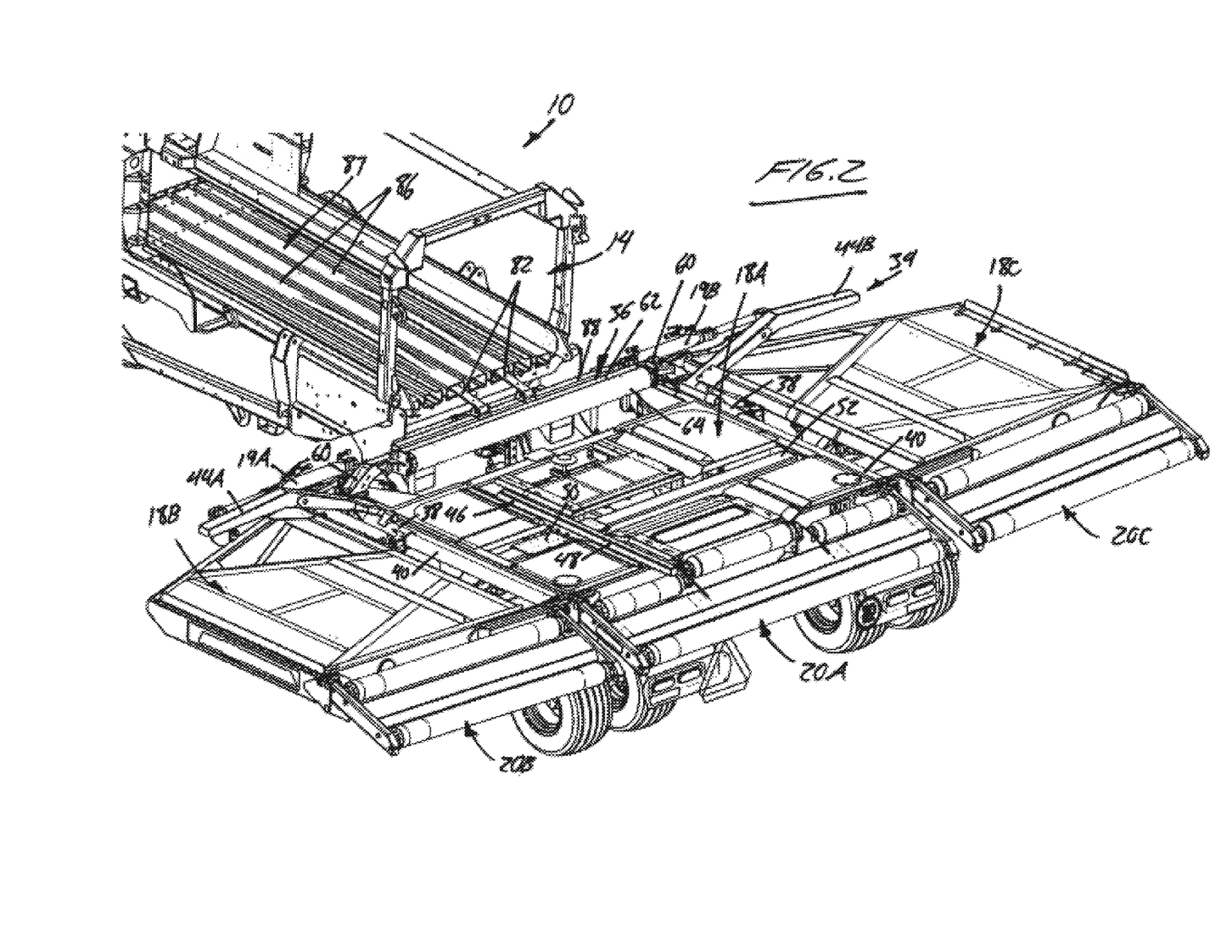
FIG. 2 is an enlarged partial closeup of FIG. 1, with a substantial fraction of the baler omitted.
Figure 3:
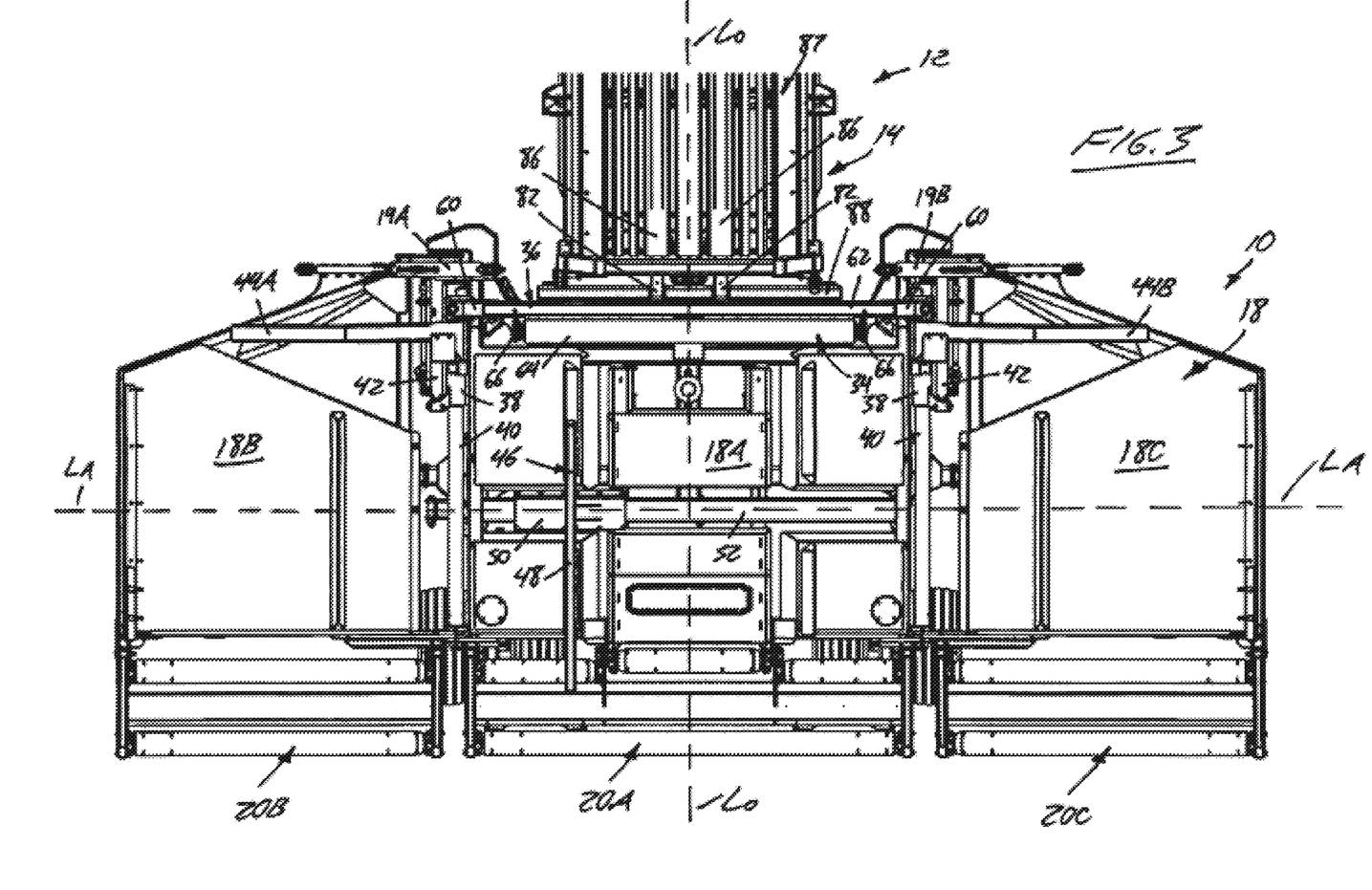
FIG. 3 is a top plan view of the bale accumulator of FIG. 1, again with a substantial fraction of the baler omitted.

Rolling support of the bale platform 18 is provided by left and right wheel assemblies 22A, 22B installed at the underside of the middle section 18A of the bale platform 18 on opposing left and right sides of a bisecting vertical midplane thereof that longitudinally bisects the bale platform midway between the two wing sections. In FIG. 3, this bisecting midplane coincides with the longitudinal axis $L_O$, owing to a straight in-line relation of the bale platform 18 to the baler 12 in the working field mode of the accumulator, where the bisecting vertical midplanes of the baler 12 and the accumulator coincide with one another to maintain continuous, centered alignment of the bale platform 18 to the rear discharge chute 14 of the baler 12. Each wheel assembly 22A, 22B comprises at least one ground wheel 24, and more particularly a pair of such ground wheels 24 in the illustrated example, of which the two wheels of each pair share a common rotational axis. The wheel axles of the two wheels 24 of each wheel assembly are carried by an inclined support leg, and upper end of which is attached to an upright swivel post 28, which in an unlocked state thereof during field use of the accumulator, is free to rotate about an upright swivel axis, thus allowing the two wheels 24 to caster. On the other hand, the swivel post 28 is also lockable against such rotation to prevent caster of the wheels, particularly during road travel of the accumulator, for example using a disc brake 30 operable on a disc flange 32 radiating from the swivel post 28.

The bale accumulator features a bale pusher 34 operable to displace bales longitudinally rearward along the bale platform 18 to dump an accumulated one or more bales from the bale platform to the field, for example via rearwardly declined and roller-equipped rear dump tails 20A, 20B, 20C of the three platform sections 18A, 18B, 18C. In the drawings, the bale pusher 34 in shown in a forward ready position thereof spanning laterally across the bale platform 18 near a front end thereof. From this forward ready position, the bale pusher 34 is displaceable longitudinally rearward of the bale platform 18 to a rear dumping position (not shown) situated more closely adjacent the rear dump tails 20A, 20B, 20C of the three platform sections 18A, 18B, 18C than to the front ends thereof adjacent which the bale pusher resides in its forward ready position. The bale pusher 34 features a bridge-like center span 36 that spans laterally across the middle section 18A of the bale platform 18 at a slightly raised elevation thereover. This center span 36 is supported at its laterally opposing ends by a pair of respective guide tubes 38, each slidably disposed around a respective guide shaft 40 that runs longitudinally of the middle platform section 18A at a respective outer edge thereof in a position neighboured by a respective one of the wing sections 18B, 18C. Each guide tube 38 is rearwardly displaceable along the respective guide shaft 40 by extension of a respective hydraulic actuator 42, and is also forwardly displaceable along the respective guide shaft 40 by collapse of that respective hydraulic actuator 42, whereby synchronous extension of the two hydraulic actuators 42 denotes a push stroke displacing the bale pusher 34 from its forward ready position to its rear dumping position, and subsequent synchronous collapse of the two hydraulic actuators 42 denotes a reset stroke returning the bale pusher 34 from its rear dumping position back to its forward ready position.

In addition to the center span 36 spanning across the middle section 18A of the bale platform 18, the bale pusher 34 also features left and right extensions 44A, 44B each carried on a respective one of the guide tubes 38, and pivotal relative thereto about an axis parallel to those the concentrically related guide tube 38 and guide shaft 40. The extensions 44A, 44B are thus pivotable between field and storage positions that respectively correspond to the working and transport positions of the wing sections 18B, 18C of the bale platform 18. In the working positions of the wing sections 18B, 18C, the left and right bale pusher extensions 44A, 44B reside in their field position, in which they emanate laterally outward from the guide tubes 38 in slightly elevated relation above the left and right wing sections 18B, 18C respectively, whereby any bales seated on the wing sections 18B, 18C are pushable off the rear tails 20B, 20C of the wing sections 18A, 18B by the extensions 44A, 44B of the bale pusher 34 during the rearward push stroke thereof. When the wing sections 18B, 18C are folded up for transport, the bale pusher extensions 44A, 44B are likewise pivoted inward about their pivotal connections to the guide tubes 38 to fold them inwardly over middle section 18A of the bale platform for stowage during road transport.

A lateral positioning device 46 for shifting the rectangular bales laterally of the bale platform 18 features a push bar 48 that lies longitudinally of the middle platform section 18A and is carried on a laterally-movable carriage 50 that rides on a lateral cross-member 52 of the middle platform section 18A. A hydraulic actuator (not shown) installed at the underside of the middle platform section is operable to displace the carriage 50 and attached push bar 48 back and forth across the middle platform section between a leftward position (illustrated) nearer to the left wing section 18B of the platform 18 than to the right wing section 18C thereof, and a rightward position nearer to the right wing section 18C of the platform 18 than to the left wing section 18B thereof. In the working field mode of the accumulator 10, the leftward position of the push bar 48 resides generally inline with a left side of the baler's rear discharge chute 14, and the rightward position of the push bar 48 resides generally inline with a left side of the baler's rear discharge chute 14. Using the illustrated leftward position as a default starting position of the lateral positioning device 46, a first bale ejected from the baler 12 centrally onto the middle platform section 18A behind the bale pusher 34 can be displaced rightward by actuated rightward movement of the push bar 48 to its rightward position, a second bale then ejected from the baler 12 centrally onto the middle platform section 18A behind the bale pusher 34 beside the relocated first bale can then be displaced leftward by actuated leftward movement of the push bar 48 back to its leftward position, which opens up a space between these first two bales on the middle platform section 18A to accommodate receipt of a third bale being ejected from the baler 12. Depending on the relative bale and platform size, another rightward shifting of the push bar 48 can then be performed to shift the first and third bales rightward, opening up a space on the middle platform section 18A between the second and third bales, followed by ejection of a fourth bale into this space, then followed by another leftward shifting of the push bar 48 to shift the second and fourth bales leftward, to accommodate ejection of a fifth bale centrally onto the middle platform section between the relocated third and fourth bales, whereafter all five bales can be dumped to the field via the rearward push stroke of the bale pusher 34.

The center span 36 of the bale pusher 34 comprises terminal support brackets 60 respectively affixed to the guide tubes 36 in positions standing upward therefrom, for example at inwardly angled inclination therefrom, a main cross-bar 62 spanning laterally between the terminal support brackets 60, and a roller 64 rotatably carried on the cross-bar 62 by rearwardly cantilevered roller supports 66 that hold the roller 64 a short offset distance behind the cross-bar 62, at an elevation placing the 12 o'clock apex of the roller 64 at an elevation slightly above that of the topside of the cross-bar 62. A pair of static catch brackets 68 are affixed to the cross-bar 62 at a front side thereof of opposing relation to the rear side thereof at which the roller 64 is disposed, the novel purpose of which will become apparent further below.

Connection of the accumulator 10 to the baler is effected via a variable length drawbar 70, which in the illustrated example is composed of a hollow tubular rear section 72 that is affixed to the underside of the middle section 18A of the bale platform 18 in a position running longitudinally thereof, and an extendable/retractable front section 74 that is telescopically received in the hollow tubular rear section 74 through an open front end thereof for selectively longitudinal extension and retraction of this telescopic front section 74 relative to the platform-affixed rear section 72. The drawbar 70, and the result of its longitudinal expansion and collapse (via an associated actuator, not shown) is perhaps best appreciated with reference to the side elevational views of FIGS. 4 and 5. The front section 74, at an exposed portion thereof that remains outside the rear section 72 throughout a full telescopic range of the drawbar's extension and collapse, features an upstanding hitch mount 75 to which a hitch coupler 76 is attached in a position cantilevering forwardly therefrom past a front end of the front section 74 of the drawbar. This hitch coupler 76 makes connection with a hitch 78 found on the baler near the rear end of, and beneath the floor of, the baler's rear discharge chute 14. The hitch coupler 76 and the hitch 78 are of compatible types capable of permitting yawing movement of the drawbar 70 about an upright yaw axis $A_Y$ defined at the interface of the hitch 78 and the hitch coupler, which thereby allows such yawing movement of the bale platform 18 of the accumulator 10 relative to the baler 12 about this yaw axis at times where there is a lack of other mechanical constraints between the accumulator and baler to prevent such movement. In the illustrated example, the hitch 78 is a clevis hitch having an upright hitch pin that defines the yaw axis $A_Y$, and the hitch coupler 76 is a drawbar ring presenting an eye through which the hitch pin is engageable to enable swivelling movement in a yawing direction about the upright hitch pin.

With the drawbar 70 longitudinally collapsed to its minimal length, thus minimizing the forwardly projecting reach of the drawbar's front section 74 from the hollow rear section 72 thereof, the front end of the middle platform section 18A of the accumulator 10 resides closely adjacent to the rear end of the baler's rear discharge chute 14, so that the bale pusher 34, in the forward ready position thereof, likewise resides closely adjacent to the rear end of the baler's rear discharge chute 14. This state of the bale platform 18, in workably close relationship to the rear discharge chute 14 of the baler 12 to receive ejected bales therefrom, is referred to as the working field position of the bale platform 18, in association with which the swivel posts 30 of the wheel assemblies 22A, 22B are unlocked to allow the ground wheels 24 to caster. In contrast, extension of the variable length drawbar 70 to increase the overall length thereof, thus maximizing the forwardly projecting reach of the drawbar's front section 74 from the hollow rear section 72 thereof, serves to offset the bale platform 18 further longitudinally rearward from the rear end of the rear discharge chute 14 of the baler 12, in association with which the swivel posts 30 of the wheel assemblies are locked in positions placing the rotational axes of the ground wheels 24 perpendicular to the accumulator's bisecting longitudinal midplane, which locking action thus prevents castering of the grounds wheels 24.

The present invention employs a pair of elongated front bale supports 82, each preferably in the form of a respective spring steel strap, and in the illustrated case, embodied by a single-leaf leaf spring having a rolled eye at each end to enabled pinned connections of such rolled ends to other components, for the same beneficial purpose set forth above with respect to the prior art. The present invention also includes novel arrangements by which these front bale supports 82 are both couplable to, and decouplable from, the bale pusher 34 of the bale accumulator. Coupling thereof as part of the transition of the bale accumulator from road transport mode to working field mode enables purposeful use of these front bale supports 82 in cooperative relation to the bale pusher 34 during field use of the bale accumulator 10, yet decoupling of the front bale supports 82 from the bale pusher 34 as part of the transition of the bale accumulator 10 from working field mode back to road transport mode removes a mechanical constraint that would otherwise prohibit the ability of the bale platform 18 to yaw relative to the baler 12 for improved road maneuverability. While the illustrated embodiments each include two front bale supports 82 to ensure competent handling of wider bales, other embodiments for handling narrower bales may optionally have only a singular such front bale support 82. Any quantity of front bale supports, from as few as a singular bale support, to any plurality of bale supports, whether that be two or more, is within the scope of the present invention.

A front end of each bale support 82, through a rolled eye formed thereat, is pinned to a front mount embodied by one or two polymeric slide blocks 84 (FIG. 8) slidably disposed in a respective longitudinal channel 86 found in a floor structure 87 of the rear discharge chute 14 of the baler 12. A rear end of each bale support 82, likewise through a rolled eye formed thereat, is pinned to a rear mount that, in this embodiment, is embodied by a shared catch bar 88 that lies perpendicularly of the two front bale supports 82 at the rear ends thereof. Each bale support 82 is pinned to a respective pair of lugs on the topside of this shared catch bar 88, which in the illustrated example of formed by a length of rectangular metal tubing. The catch bar 88 lies laterally of the baler 12 and accumulator 10, and is selectively receivable in the two catch brackets 68 fixed to the frontside of the main cross bar 62 of the bale pusher 34 in order to thereby couple the two front bale supports 82 to the bale pusher 34, specifically as part of the transition of the accumulator into its working field mode. For the purpose of enabling transition of the catch bar 88 into and out of the catch brackets 68 on the bale pusher 34, the baler 12 is equipped with a pair of lifting actuators 92, each mounted to an actuator support bracket 94 affixed to the rear discharge chute 14 of the baler 12 adjacent a respective side thereof. Each lifting actuator 92 is supported by its respective bracket 94 at an elevation below the floor 87 the rear discharge chute 14 and a short distance longitudinally rearward of the terminal rear of said floor 87 of the rear discharge chute 14. The lifting actuators 92 resides in alignment with the catch bar 88 when the front bale supports 82 resides in a forwardly retracted state residing mostly within the respective channels 86 of the baler's floor structure 87, and thus having minimal rear reach therefrom.

Figures 4, 5:
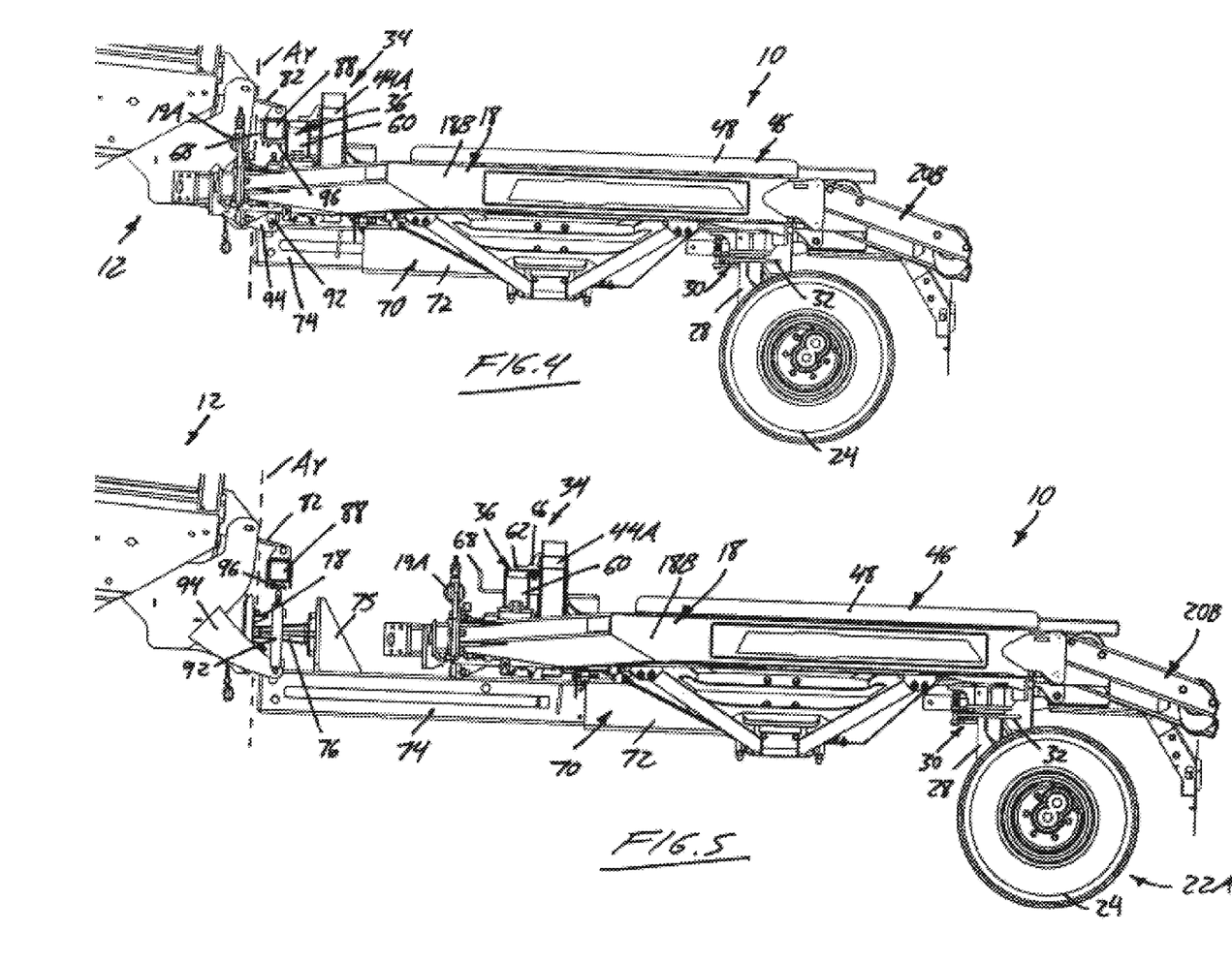
FIG. 4 is a side elevational view of the of the bale accumulator of FIG. 1, again with a substantial fraction of the baler omitted.
FIG. 5 is another side elevational view of the of the bale accumulator of FIG. 4, but in a road transport mode in which the bale platform of the accumulator trails the rear discharge of the baler at a greater longitudinally rearward distance therefrom, and is able to undergo yawing movement relative thereto for improved road maneuverability.
Figure 6:
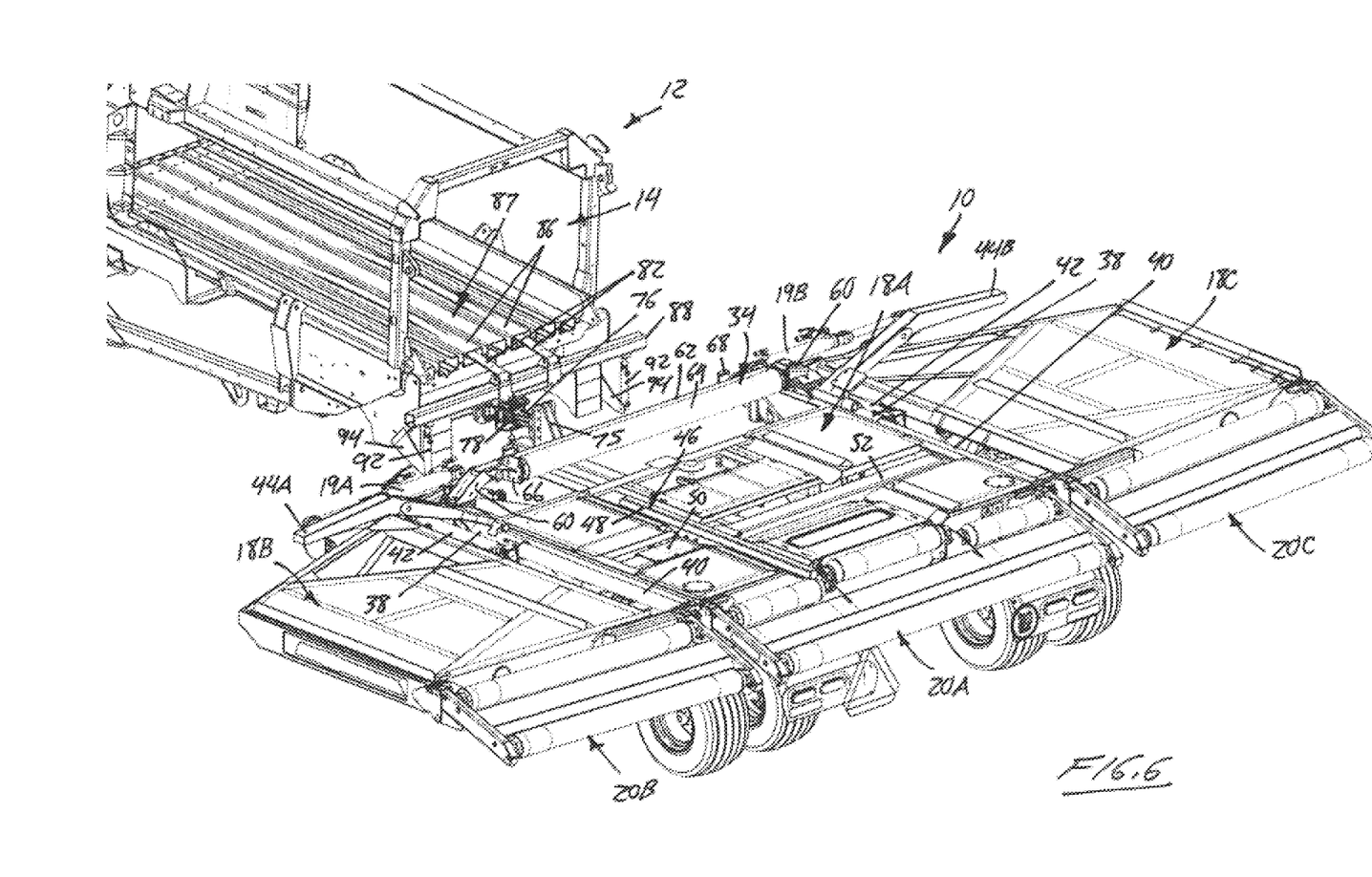
FIG. 6 is a top rear perspective view of the bale accumulator of FIG. 5.
Figure 7:
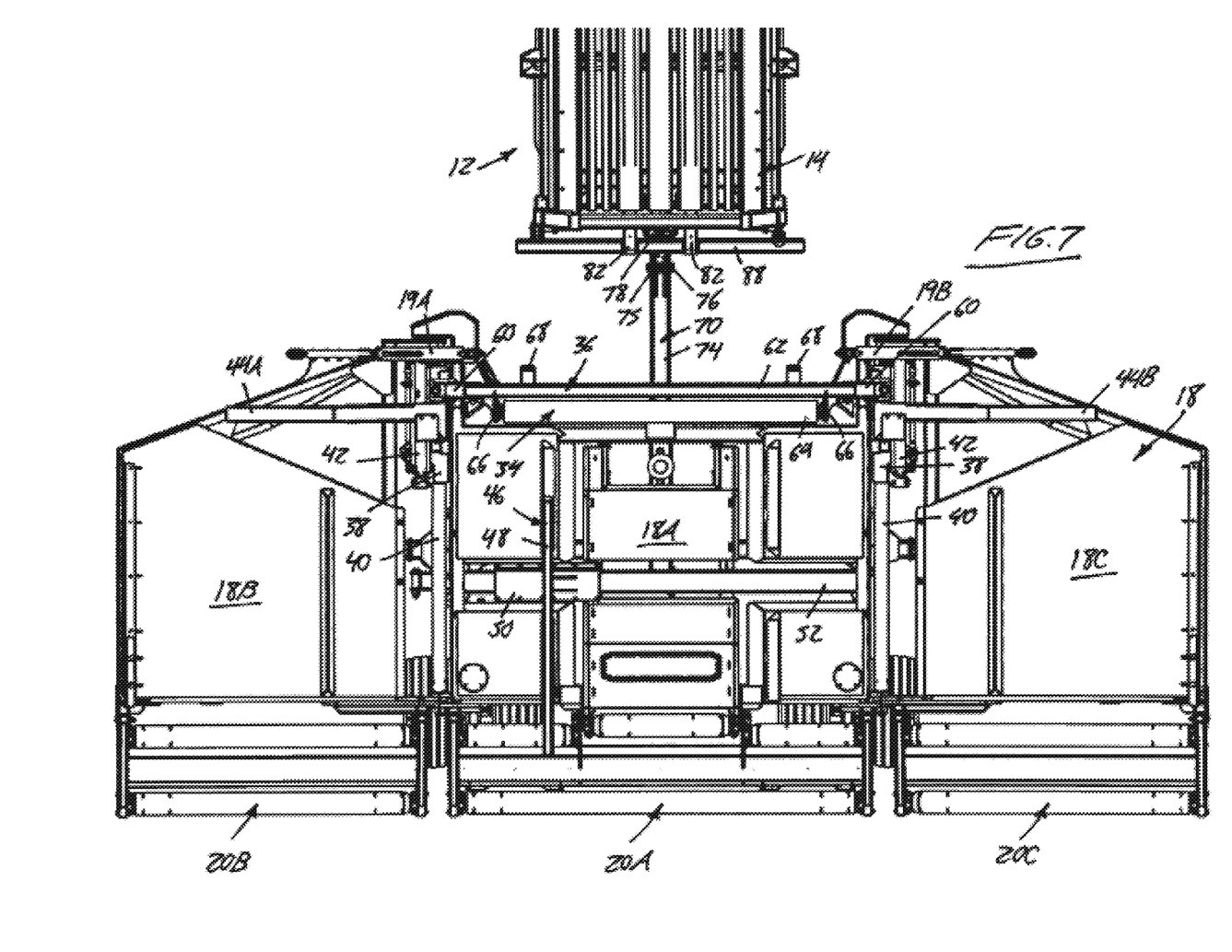
FIG. 7 is a top plan view of the bale accumulator of FIG. 5.
Figure 8:
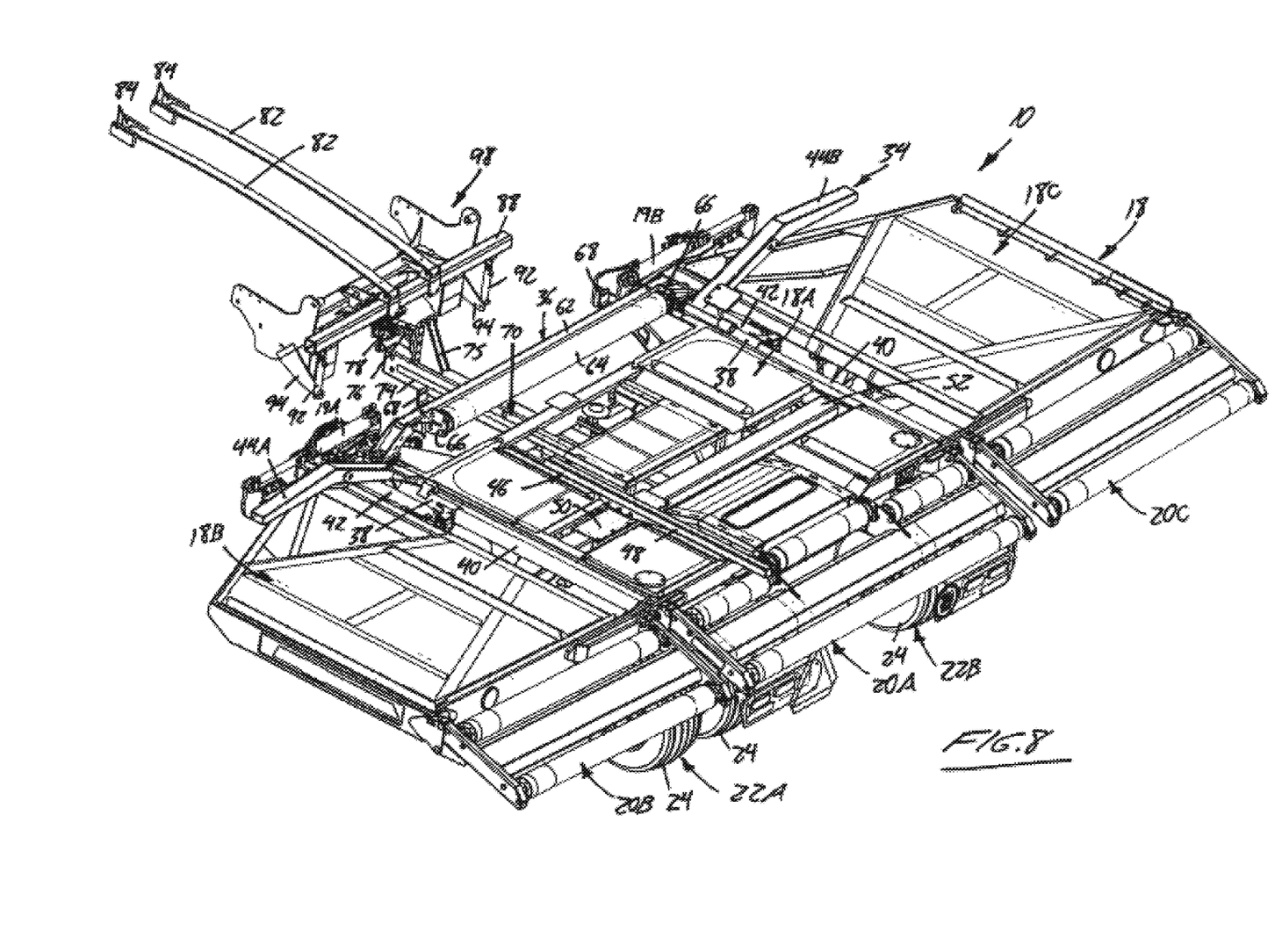
FIG. 8 is a top rear perspective view of the bale accumulator of FIG. 5, with an entirety of the baler omitted.

Referring to FIGS. 4 and 5, FIG. 5 shows the accumulator 10 in the road transport mode, where the bale platform 18 is shifted notably rearward from the rear end of the baler's rear discharge chute 14, and the sole mechanical connection between the accumulator 10 and the baler is the yaw-permitting hitch connection between the hitch coupler 76 and the hitch 78, whereby the drawbar 70 and attached bale platform 18 of the accumulator 10 can yaw relative to the baler 12 about the upright yaw axis $A_Y$ to permit tighter road cornering of the tractor, baler, accumulator combination. In this road transport mode, the catch bar 88 spanning across the front ends of the front bale supports 82 is completely disengaged from bale pusher 34 of the accumulator 10, and thus doesn't impart any restriction to such yawing movement of the drawbar 70 and bale platform 18 during road travel.

To transition the accumulator 10 from the road transport mode of FIG. 5 into the working field mode of FIG. 4, the two lifting actuators 92 on the baler 12 are extended, thereby lifting up the catch bar 88 and the attached front ends of the front bale supports 82, specifically lifting the catch bar 88 to a greater elevation than that occupied by the front ends of the two catch brackets 68 on the cross-bar 62 of the bale pusher 34. Then the length variable drawbar 70 is collapsed, via operation of its actuator, to draw the accumulator's bale platform 18 into the working field position, which aligns the catch brackets 68 of the bale pusher 34 beneath the actuator-lifted catch bar 88. At this point, the lifting actuators 92 are collapsed, as a result of which the catch bar 88 is dropped into the catch brackets 68 of the bale pusher 34, thereby effectively coupling the two front bale supports 82 to the bale pusher 34 for movement therewith during field use of the baler and accumulator. There is not attachment between the catch bar 88 and the lifting cylinders 92, whose top ends act on the underside of the catch bar 88, but are not mechanically coupled thereto. As shown, the underside of the catch bar 88 may have a pair of tent-like contact seats 96 on the underside thereof at positions thereon corresponding to the two lifting actuators 92 to ensure confident, stable contact therebetween during lifting and lowering of the catch bar 88. During field use, the captured state of the catch bar 88 in parallel relationship alongside the cross-bar 62 of the bale pusher 34 prohibits yawing movement of the accumulator 10 relative to the baler 12, and the accumulator thus resides and remains longitudinally inline with the baler (where they share a same bisecting longitudinal midplane, denoted by longitudinal axis $L_O$ in FIG. 3) at all times, thus maintaining properly centered alignment of the bale platform 18 with the rear discharge chute 14 of the baler 12. Other mechanical constraints between the baler 12 and the accumulator 10 may be also be specifically implemented in the working field position help maintain such static, inline relationship between the baler 12 and the accumulator.

After field use of the baler 12 and accumulator 10 is complete, and return of the accumulator 10 to road transport mode is desired, the bale pusher 34 is returned to its forward ready position, if not already so situated, such that the catch bar 88 once again resides directly overhead of the two lifting actuators 92, as shown in FIG. 4. The lifting actuators 92 are once again extended, this time thereby lifting the catch bar 88 upwardly out of the catch brackets 68 of the bale pusher 34, thereby decoupling the two front bale supports 82 from the bale pusher 34, whereafter the variable length drawbar 70 is then extended (by operation of its respective actuator) to push the bale platform 18 rearwardly away from the rear discharge chute of the baler 14. Having disengaged the two front bale supports 82 from the bale pusher 34, the only remaining mechanical connection between the accumulator 10 and the baler is the yaw-permitting hitch connection between the drawbar's hitch coupler 76 and the baler's hitch 78. The full transition from the working field mode to the road transport mode also includes locking of the swivel posts 30 of the wheel assemblies in non-castered positions in which the rotational axes of the ground wheels 24 lie laterally of the accumulator (i.e. perpendicularly of the drawbar 70, and thus also perpendicularly of the bisecting longitudinal midplane of the accumulator 10 at which the centered drawbar 70 resides). In reverse of this, the full transition from the road transport mode to the working field mode includes unlocking of the swivel posts 30 of the wheels assemblies 22A, 22B to permit castering thereof during field use.

In summary of the first embodiment, the catch brackets 68 fixed to the cross-bar 62 of the bale pusher 34 in static positions thereon, the actuator-movable catch bar 88 fixed to the front bale supports 82, and the associated lifting actuators 92 for lifting that shared catch bar 88, all cooperatively form an operable coupler/decoupler by which the front bale supports 82 and the bale pusher 34 are selectively couplable to one another, for working field use, and selectively decouplable from one another to permit yaw-capable, non-castered trailing of the accumulator's bale platform 18 further behind the baler 12 for improved road handling capability during transport. In this embodiment, the lifting actuators 92 relied on to perform this coupling and decoupling action are mounted to the baler 12, not the accumulator 10, and in the illustrated embodiment are embodied in a larger overall rear-end baler attachment 98 (FIG. 8) that also incorporates the hitch 78 for mating with the hitch coupler 76 of the variable length drawbar 70. The hitch and hitch coupler type may vary from those shown and described, provided that the selected types are capable of permitting the described yaw movement of the drawbar 70 and bale platform 10 in the road transport mode of the accumulator 10. Through use of hydraulic actuators, typically coupled to the hydraulic system of the baler-towing tractor for operation thereby, for the collapse and extension of the variable length drawbar 70 and for the lifting and lowering of the catch bar 88 of the coupler/decoupler, the entire transition of the accumulator 10 between the two modes can all be effected in actuated fashion from the operator cabin of the tractor.

Figure 9:
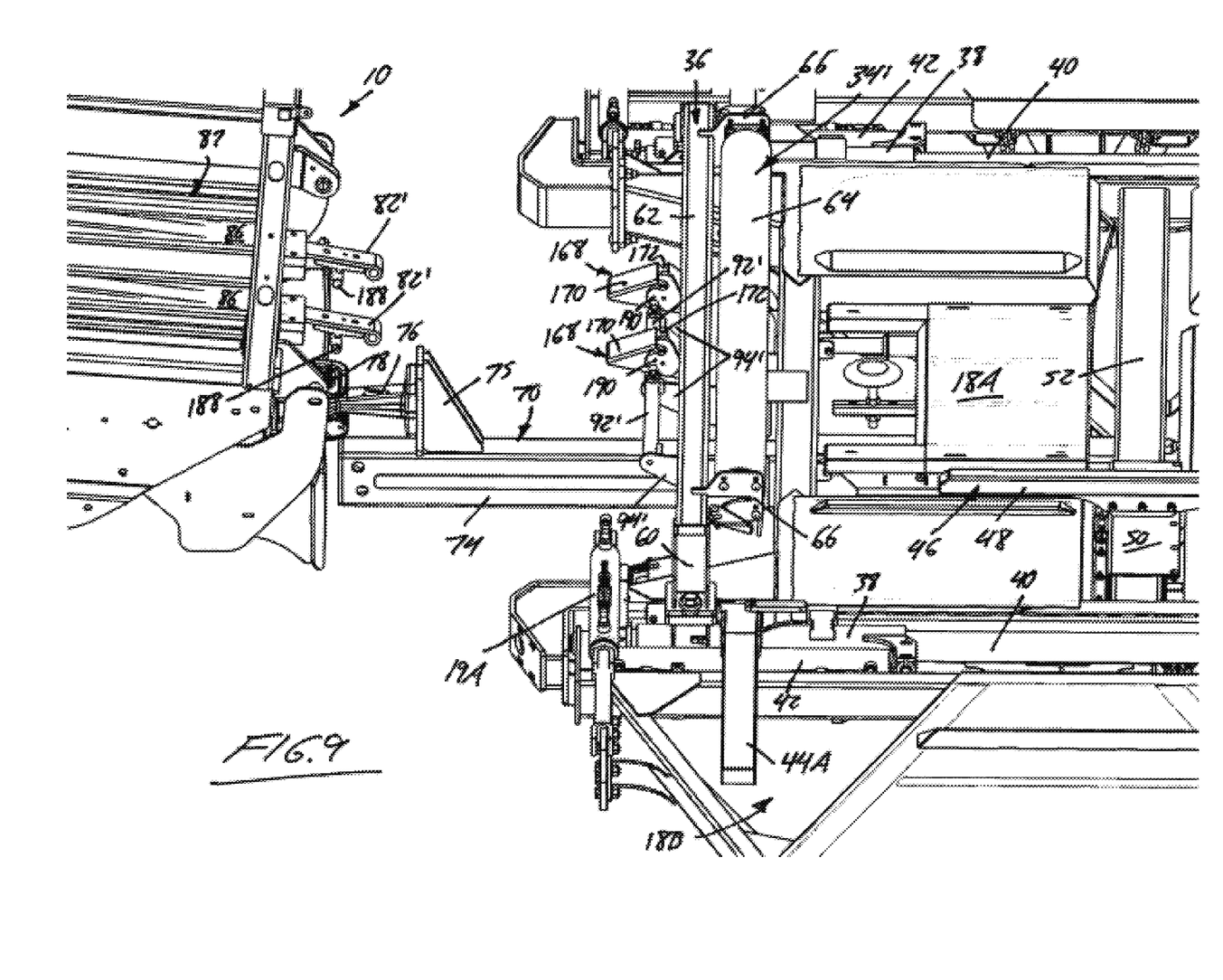
FIG. 9 is partial top side perspective view of a second embodiment of the bale accumulator in its road transport mode with its bale platform at notably spaced relation to the rear discharge of the baler, with the view zoomed in on a rear end of the baler and s front end of the accumulator to emphasize coupler/decoupler details found thereat that differentiate this embodiment from the preceding embodiment of FIGS. 1 through 8.
Figures 10, 11:
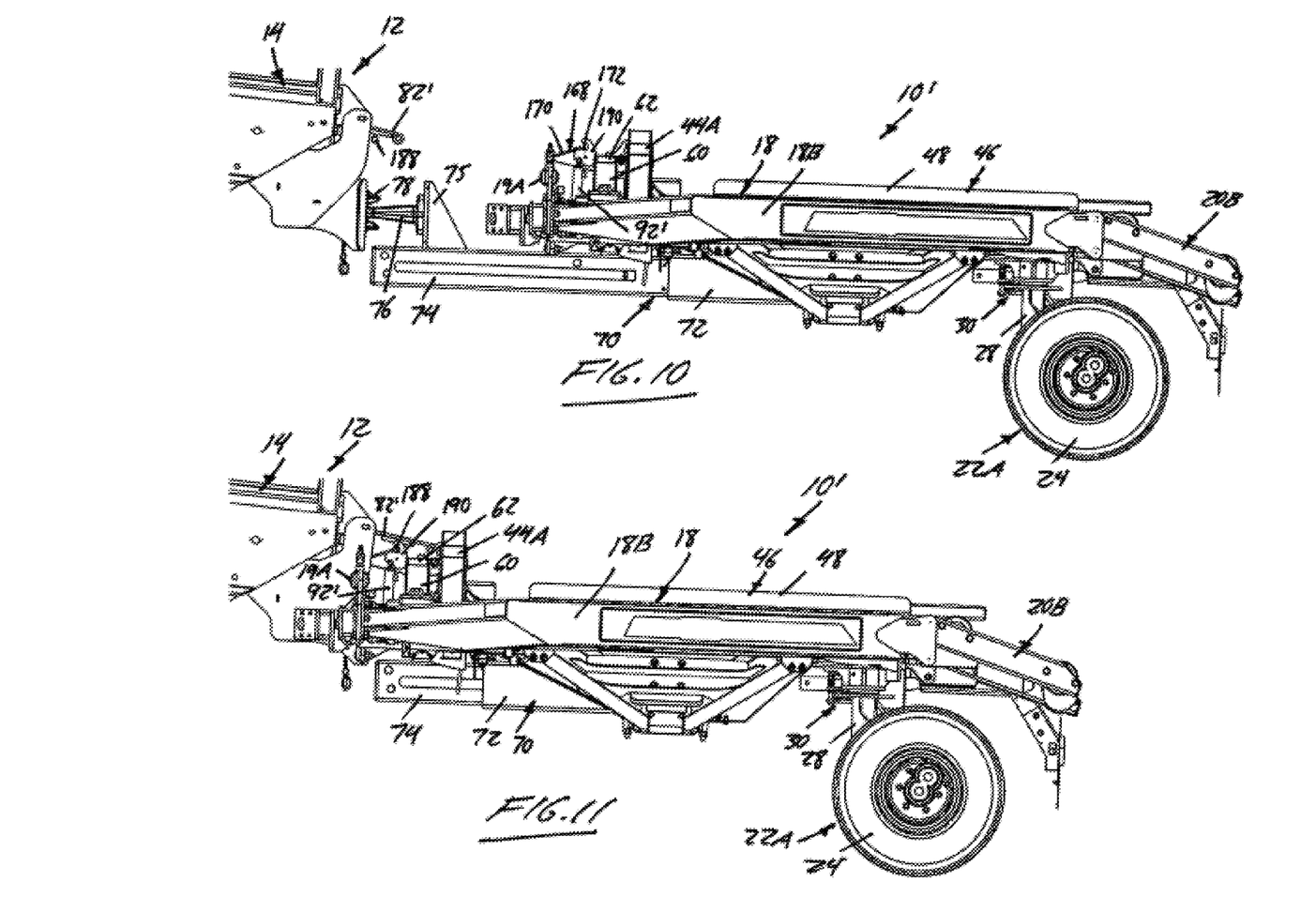
FIG. 10 is a side elevational view of the bale accumulator of FIG. 9.
FIG. 11 is a side elevational view of the bale accumulator of FIG. 10, but in the working field mode thereof in which the bale platform is of closer working adjacency to the rear discharge of the baler.

FIG. 9 illustrates a second of the accumulator 10' that differs from the preceding embodiment in terms of the design of the coupler/decoupler by which the bale pusher 34' and the front bale supports 82' are selectively couplable for the working field mode, and decouplable for the road transport mode. This embodiment is described only in relation to the features and components that differ from those of the preceding embodiment of FIGS. 1 through 8, and may otherwise be identical to that preceding embodiment. The bale pusher 34' and the front bale supports 82' in this embodiment differ from the preceding embodiment only in the features thereof by which they are couplable and decouplable to and from one another.

Instead of the two catch brackets 68 of the preceding embodiment into which an actuated catch bar 88 is lifted, the front side of the cross-bar 62 of the bale pusher 34' in this embodiment is instead equipped with two ramped catch blocks 168, the topsides of each are each characterized by a rearwardly inclined ramp surface 170 that starts from a front end of the catch block 168 and slopes upwardly rearward therefrom, toward the cross-bar 62, and terminates at a concavely rounded catch seat 172 that resides at an upper rear end of the ramp surface 170. In the illustrated example, instead of the two front bale supports 82' sharing a common rectangular catch bar 88 like the preceding embodiment, each bale support 82' features its own smaller round catch bar 188 for cradled receipt thereof by the concave catch seat 172 of a respective one of the two catch blocks 168. That said, the two front bale supports 82' in this embodiment could alternatively share a singular round catch bar between them, which in the coupled state of the front bale supports 82' and the bale pusher 34' would be seated in both round catch seats 172 of the two catch blocks 168.

In this embodiment, the rear ends of the front bale supports 82' and the associate catch bars 188 need not be lifted by lifting actuators to enable engagement with and disengagement from the bale pusher 34. Instead, during collapse of the variable length drawbar 70 to draw the baler 12 and the accumulator 10 closer together to achieve the working field mode, the catch bars 188 on the undersides of the front bale supports 82' will ride up the ramp surfaces 170 of the two catch blocks 168, and will land in the catch seats 172 once the working field position of the bale platform 18 is achieved. To lock the landed catch bars 188 in place on the catch seats 172, and thereby provide a positive coupling of the front bale supports 82' to the bale pusher 34, each catch block 168 is accompanied by a respective movable latch 190. Each latch 190 is spring biased into a latching position in which an upper jaw of the latch 190 hooks over a topside of the respective catch bar 188 in the seated position thereof in the catch seat 172. During collapse of the variable length drawbar 70, as the catch bars 188 approach the catch seats 172 at the top ends of the ramp surfaces 170, the catch bars 188 push initially push rearward on the top jaws of the two latches 190, momentarily rocking them rearward against the spring bias, which opens up the mouths of the latches 190 to admit the catch bars 188 thereinto. Here the catch bars 188 sink into the concavely recessed catch seats 172, and the latches 190 automatically close down over the seated catch bars 188 via the spring biased closing action of these latches 190.

This embodiment of the coupler/decoupler thus uses a spring-biased auto-latching function to couple the front bale supports 82' to the bale pusher 34' during transition of the accumulator 10 into its working field position, without need to trigger any actuator input to achieve such coupling. However, the present embodiment of the coupler/decoupler does require actuation to subsequently decouple the front bale supports 82' from the bale pusher 34' as part of the transition back to road transport mode. For such purpose, a pair of latch actuators 92' are provided on the accumulator 10, not the baler 12, for example supported by actuator support brackets 94' mounted below the catch blocks 168. Each latch actuator 92' resides at a position that, in the forward ready position of the bale pusher 34', aligns with a respective one of the latches 190 for engagement therewith, but lacks any attachment thereto, as necessary to accommodate movement of the latches and catch blocks with the bale pusher 34' during the push and reset strokes thereof in field use. Extension of each latch actuator 92', when aligned with the respective latch 190 in the forward ready position of the bale pusher 34', is operable to rotate the respective one of the latches 90 out of its spring-biased latching position to release the latched stated of the respective catch bar 188, whereupon the variable length drawbar 70 can be extended (via operation of its actuator) to push the bale platform 18 rearwardly away from the baler 12. This pushes the catch blocks 168 out from under the catch bars 188, and thereby decouples the two front bale supports 82' from the bale pusher 34, whereafter the latch actuators 92' can be retracted, allowing the latches 190 to return to their default spring biased positions.

Both embodiments thus employ a coupler/decoupler composed of one or more catch features on the bale pusher (catch brackets 68, catch blocks 168) to which a shared or respective rear mount (shared catch bar 88, individual catch bars 188) on one or more front bale supports 82, 82' is selectively engageable and disengageable, in actuated fashion, to selectively couple and decouple the front bale supports 82, 82' to and from the bale pusher 34 of the accumulator to enable transition of the accumulator between a yaw-capable road transport mode trailing distally behind the baler in spaced relation therefrom, and a yaw-incapable, statically in-line working field mode drawn into close working adjacency to the baler with the front bale support operably coupled to the bale pusher for cooperative movement therewith to handle continuous operation of the baler throughout the push and reset strokes of the bale pusher. The different embodiments demonstrate alternate actuation possibilities for the coupler/decoupler, including positional adjustment of the rear mount(s) of the front bale supports (first embodiment), or actuation of latching componentry that captures the rear mount (second embodiment).

Like with the first embodiment, while the second embodiment is shown with two front bale supports, variants intended for working only narrower bales may alternatively have only a singular front bale support. Despite the lesser quantity of bale supports in such instance, it may nonetheless be beneficial to still have multiple catch seats and multiple latches to provide seated, latched securement at multiple points across the width of the middle platform section 18A of the accumulator 10. Also, while the illustrated embodiments denote winged bale accumulators that are of notably greater working width than the baler 12, but are foldably collapsible for narrower road transport, it will be appreciated that the novel principles of the present invention may be similarly implemented in bale accumulators of various scale and style, whether foldably winged or not.

Since various modifications can be made in the invention as herein above described, and many apparently widely different embodiments of same made, it is intended that all matter contained in the accompanying specification shall be interpreted as illustrative only and not in a limiting sense.

The invention claimed is:

1. A bale accumulator for towed conveyance behind a rectangular baler that produces rectangular bales of crop material as the baler traverses an agricultural field in a forward travel direction and extrudes the bales longitudinally rearward from a rear discharge of the baler, said bale accumulator comprising:
    a platform for receiving said rectangular bales from the rear discharge of the baler;
    a variable length drawbar attached to said platform, said variable length drawbar being longitudinally extendable and collapsible to vary a distance between said platform and said rear discharge of the baler, thereby enabling selective adjustment of the platform between a working field position and a road transport position, of which said working field position is of closer adjacency to said rear discharge of the baler than said transport position;
    a hitch coupler installed on said variable length drawbar adjacent a leading end thereof for coupled connection to a hitch mounted on the baler in a manner enabling the platform to yaw relative to the baler, about an upright yaw axis, when in the road transport position;
    a bale pusher movably supported on the platform and longitudinally displaceable thereon in a rearward push stroke for pushing bales rearwardly along the platform for discharge therefrom to the field, and in a forward reset stroke resetting the bale pusher to a ready position for a next repetition of the rearward push stroke;
    a front bale support of elongated character in the longitudinal direction, and having a front mount configured for longitudinal slidable mounting thereof to the baler, and a rear mount selectively couplable to and decouplable from the bale pusher for longitudinal displacement therewith along the platform when coupled thereto;
    a coupler/decoupler installed in cooperatively relationship to the bale pusher and the front bale support and operable to couple the rear mount of the front bale support to the bale pusher for cooperative use thereof in the working field position of the bale platform to enabling riding of the rectangular bales over said front bale support from the rear discharge of the baler to a pushable position behind the bale pusher, and to decouple the rear mount of the front bale support from the bale pusher to permit said yaw movement in the road transport position of the bale platform.

2. The bale accumulator of claim 1 wherein the coupler/decoupler comprises at least one static catch on the bale pusher to which the rear mount of the front bale support is engaged when the bale pusher and the front bale support are coupled together.

3. The bale accumulator of claim 2 wherein the coupler/decoupler further comprises at least one movable latch operably positioned relative to the at least one static catch to maintain engagement of the rear mount of the front bale support thereto in a latched state of said at least one movable latch.

4. The bale accumulator of claim 3 further comprising at least one latch actuator operable to move said at least one movable latch between said latched state and a release state.

5. The bale accumulator of claim 2 wherein said at least one static catch comprises at least one inclined ramp on which the rear mount of the front bale support is guided toward at least one coupling seat of said at least one static catch during transition of the platform from the road transport position to the working field position.

6. The bale accumulator of claim 5 wherein said at least one coupling seat comprises at least one concave recess and the rear mount of the front bale support comprises at least one round bar for cradled seating thereof in said at least one concave recess.

7. The bale accumulator of claim 1 wherein the coupler/decoupler comprises at least one lifting actuator operable to selectively lift the rear mount of the front bale support in transition thereof between coupled and uncoupled relation to the bale pusher.

8. The bale accumulator of claim 7 wherein said at least one lifting actuator is embodied in a baler attachment mounted or mountable to the baler near the rear discharge thereof.

9. The bale accumulator of claim 8 wherein said baler attachment also embodies the hitch that is mounted on the baler.

10. A method of transitioning a baler and an accompanying bale accumulator from a working field mode to a road transport mode, said method comprising:
    (a) in either order:
        (i) from a bale pusher of the bale accumulator, decoupling a rear mount of a front bale support of the bale accumulator that, in the working field mode, spans longitudinally forward from bale pusher of the accumulator to the baler, where a front mount of said front bale support is engaged with the baler in a longitudinally slidable manner to permit forward and rearward displacement of said front bale support with the bale pusher; and
        (ii) longitudinally extending a variable length drawbar by which the bale accumulator is connected to a hitch of the baler, thereby shifting a platform of the bale accumulator longitudinally rearward from a working field position to a road transport position of increased longitudinal distance from the baler compared to said working field position; and (b) with the platform of the bale accumulator in the road transport position, and with the front bale support of the bale accumulator decoupled from the bale pusher, permitting the bale accumulator to yaw relative to the baler about an upright yaw axis at which the variable-length drawbar is connected to the hitch of the baler, but about which yawing of the bale accumulator is prohibited in the working field mode, owing at least in part to coupled connection of the front bale support of the bale accumulator to the bale pusher thereof.

11. The method of claim 10 wherein step (a)(i) comprises decoupling the rear mount of the front bale support of the bale accumulator from the bale pusher thereof using at least one actuator.

12. The method of claim 11 comprising using said at least one actuator to lift the rear mount of the front bale support out of engagement with the bale pusher.

13. The method of claim 12 wherein said at least one actuator is mounted on the baler.

14. The method of claim 11 comprising using said at least one actuator to release a latched coupling between the bale pusher and the rear mount of the front bale support.

15. The method of claim 14 wherein said at least one actuator is mounted on the bale accumulator.

16. The method of claim 10 comprising performing step (a)(i) before step (a)(ii).

17. A method of transitioning a rectangular baler and an accompanying bale accumulator towed therebehind from a road transport mode to a working field mode, said method comprising:

(a) in either order:
  (i) longitudinally collapsing a variable length drawbar by which the bale accumulator is connected to a hitch of the baler, thereby shifting a platform of the bale accumulator longitudinally toward from the baler from a road transport position to a working field position of closer adjacency to the baler than said road transport position; and
  (ii) to a bale pusher of the bale accumulator, coupling a rear mount of a front bale support of the bale accumulator that also has a front mount that is engaged with the baler in a longitudinally slidable manner, whereby the front bale support is slidable back and forth with the bale pusher during actuated displacement thereof and enables riding of rectangular bales from a rear discharge of the rectangular baler over said front bale support to a pushable position behind the bale pusher; and (b) with the platform of the bale accumulator in the working field position, and with the front bale support of the bale accumulator coupled to the bale pusher, prohibiting said yawing movement of the bale accumulator relative to the baler so that the bale accumulator resides in and maintains an in-line trailing relationship to the baler.

18. The method of claim 17 wherein step (a)(ii) comprises use of at least one actuator in coupling of the rear mount of the front bale support of the bale accumulator to the bale pusher thereof.

19. The method of claim 18 comprising using said at least one actuator to lift the rear mount of the front bale support into an elevated position accommodating alignment of a catch feature of the bale pusher therebeneath during collapse of the variable length drawbar.

20. The method of claim 19 wherein said at least one actuator is mounted on the baler.

21. The method of claim 17 comprising where step (a)(ii) comprises using a latch to couple the rear mount of the front bale support of the bale accumulator to the bale pusher thereof.

22. The method of claim 21 wherein said latch is biased into a latching position that automatically latches the rear mount of the front bale support to the bale pusher upon achievement of the working field position in step (a)(i).

23. The method of claim 17 comprising, during step (a)(i), ramping the rear mount of the front bale support toward a coupling seat at which the rear mount is then coupled in step (a)(ii).

* * * * *